2,858,330

PREPARATION OF ACRYLATE ESTERS

Rudolph F. Fischer, Oakland, Calif., assignor to Shell Development Company, New York, N. Y., a corporation of Delaware No Drawing. Application April 29, 1957
Serial No. 655,509

7 Claims. (Cl. 260—486)

This invention relates to a method for preparing esters of acrylic acid. More particularly, it relates to a process for preparing acrylic acid esters by the splitting of ester derivatives of acrolein.

A variety of methods are known for the preparation of acrylic acid esters. Among these are the preparation and esterification of acrylic acid; the catalytic preparation of the esters from acetylene, carbon monoxide and an alcohol; the pyrolysis of lactic acid esters, and the reaction of cyanohydrins with sulfuric acid and an alcohol. The esters resulting from these preparative methods can be readily polymerized and copolymerized to yield a variety of useful products, such as transparent sheeting, resin molding powder, protective coatings, adhesives, impregnating agents for textiles, and the like.

It is an object of this invention to provide a new and improved process for the preparation of esters of acrylic acid. A further object of the invention is the provision of a process for preparing arcylic acid esters from esters of beta-acetoxypropionic acid. The acid-catalyzed splitting of beta-acetoxy propionic acid esters to produce esters of acrylic acid is a still further object of this invention. Other objects of the invention will appear hereinafter.

It has now been discovered that these and other objects may be accomplished by heating beta-acetoxypropionic acid esters in the presence of a strong acid catalyst in order to split the ester into acetic acid and the desired ester of arcylic acid, and removing the acrylic acid ester from the reaction mixture substantially as fast as it is formed. The use of the strong acid catalyst is of critical importance, since in its absence the beta-acetoxy propionate will, at the temperatures of the reaction, be unaffected by the heating. The neutral propionate can, for example, be distilled unchanged at temperatures in excess of those at which the acid-catalyzed splitting takes place. Preferably, the preparation of the acrylic acid ester is carried out by heating the esterified beta-acetoxy propionic acid at atmospheric or subatmospheric pressures in the presence of small amounts of such a strong acid catalyst as p-toluene sulfonic acid, and distilling from the reaction mixture the products of the cleavage in such a manner that the acetic acid and acrylic acid products are recovered separately.

The removal of the acetic acid and acrylic ester products of the cleavage under non-equilibrium conditions, and their separation as they are removed under those conditions, are essential features of the process of this invention. Unless the cleavage products are removed from the hot reaction mixture as they are formed, it is likely that they will undergo in situ transesterification to acetate esters and arcylic acid, with a consequent removal at equilibrium of the lowest-boiling component, the undesired acetic acid esters. For this reason, the products of the cleavage of the esterified beta-acetoxypropionic acid must be removed from the reaction mixture under non-equilibrium conditions so that the acrylate esters may be recovered intact and the transesterification prevented. The most preferable and convenient method of effecting such removal and separation is the distillation, at pressures which may be atmospheric or other than atmospheric, of the acetic acid and arcylate ester products as they form, and their division by means of a phase-separating head or other equivalent separation device.

The esters of beta-acetoxypropionic acid that are split in the process of this invention are those formed when the acid is esterified with an alcohol. While many alcohols can be used for the esterification, it has been found that the best acrylate ester yields result when the acetoxypropionic acid has been esterified with aliphatic alcohols having three or more carbon atoms. These alcohols include n-propanol, isopropanol, n-butanol, n-pentanol, etc., as well as such unsaturated alcohols as allyl alcohol, methallyl alcohol, crotyl alcohol and the like.

While such tertiary alcohols as tert-butyl, tert-pentyl and tert-hexyl alcohols may also be used, they are less preferable materials because of their comparatively low reactivity. Propionate esters, can, of course, be prepared from them, although in relatively low yield, and can be subsequently split by the process of this invention to yield the corresponding acrylate ester.

Higher fatty alcohols, such as lauryl, stearyl, palmityl and myristyl alcohols may be used to esterify the beta-acetoxy propionic acid and to yield, after cleavage of the resulting propionate ester, acrylates having important applications as lubricating oil additives. In fact, virtually any alcohol having at least three carbon atoms may be used to esterify the acid and produce the propionate esters which may be split by the process of this invention.

Beta-acetoxypropionic acid is the acid preferably employed in the preparation of these esters, and the invention has been and will be discussed in terms of this acid. However, other open-chain aliphatic beta-acyloxy propionic acids which contain only saturated carbon-to-carbon bonds may be employed; and these acids are those wherein the substituent acyloxy group is derived from a saturated fatty acid such as a lower saturated fatty acid containing up to eight carbon atoms. Beta-acyloxy propionic acids within this class include, for example, beta-propionoxypropionic acid, beta-butyroxypropionic acid, beta-isobutyroxypropionic acid, beta-valeroxypropionic acid, beta-isovaleroxypropionic acid, etc.

These and other beta-acyloxy propionic acids may be prepared in various ways. For example, in certain cases they may be prepared by treatment of beta-hydroxypropionic acid with a suitable esterifying agent, such as the acid anhydride or acid halide corresponding to the substituent acyloxy group that it is desired to introduce. In other instances, they may be prepared advantageously by treatment of a beta-halo propionic acid with, for example, a silver or other metal salt of the carboxylic acid corresponding to the acyloxy substituent group to be introduced. Although these, and other methods that are available and that will be apparent to those skilled in the art, provide numerous possible ways of preparing the beta-acyloxy propionic acids whose esters are utilized in the process of the present invention, a particularly convenient method for their preparation comprises utilizing acrolein as a raw material for their synthesis. Acrolein thus may be reacted with a carboxylic acid such as a lower fatty acid to form, by addition of the acid to the alpha and the beta carbon atoms of the acrolein, the corresponding beta-acyloxy propionaldehyde. The beta-acyloxy propionaldehyde then may be oxidized in any suitable manner to the corresponding beta-acyloxy propionic acid, for example, by treating the beta-acyloxy propionaldehyde with gaseous oxygen or an oxygen-containing gas such as air, in the presence of a catalytically-active compound of a metal, e. g., a cobalt salt such as cobalt acetonylacetonate. This method is described in U. S. Patent 2,467,876, issued April 19, 1949, to S. A. Ballard, B. P. Geyer and R. H. Mortimer, with particular reference to the oxidation of beta-acetoxypropionaldehyde to beta-acetoxypropionic acid. As has been noted, it is this acid which is the preferred acid which is esterified for use in the process of this invention, and the preparation of the acid from acrolein is a convenient route which leads to the production of the acrylic acid esters by the process described herein.

The esters of beta-acetoxypropionic acid will distill unchanged at temperatures as high as 260° C., indicating that these compounds have a high degree of thermal stability. If the esters are heated in the presence of a catalytic amount of a strong acid, however, cleavage will take place and the products will be found to comprise an acid and an acrylic acid ester. For example, when the butyl ester of beta-acetoxypropionic acid is heated in the presence of an acid catalyst, the cleavage

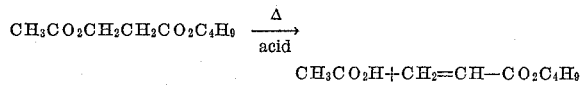

occurs, and the products are acetic acid and butyl acrylate.

The acid employed as a catalyst must be a strong acid which is not volatile under the conditions under which the cleavage is conducted and which does not itself form undesired by-products with the beta-acetoxypropionate or the cleavage products. It should, however, be an acid miscible with the propionate ester and have a boiling point greater than the cleavage temperature. Such acids are typified by the aryl sulfonic acids, of which p-toluenesulfonic acid is a preferred example. These acids are comparable in strength to sulfuric acid, but are less damaging to reactants when used in small quantities as reaction catalysts.

Alternatively, the catalyst may be in the form of an insoluble heat-insensitive solid having an acidic surface. Catalysts of this nature are exemplified by the silica-alumina cracking catalysts, which present large surfaces having markedly acidic properties. Their acidity has, for example, been reported to be of a magnitude such that a gram of catalyst can neutralize several milliequivalents of potassium hydroxide. The nature of these acidic solids is described in publications including that of Thomas, Ind. and Eng. Chem. 41, 2564 (1949).

The amount of acid required to catalyze the beta-acetoxy propionate cleavage will depend on the strength and nature of the acid employed as well as the temperature at which the cleavage is conducted. Amounts of catalyst between from about 1% to about 10% by weight of the propionate are preferably used in the process of this invention, although in individual cases greater or lesser amounts of catalyst will give satisfactory results.

The acid-catalyzed cleavage of the beta-acetoxypropionic acid ester is best conducted at temperatures in excess of 100° C. The rate of the reaction increases with increases in temperature, and convenient rates at which to recover the reaction products are obtained at higher temperatures. The boiling temperature of the propionate ester being split is a preferred temperature and convenient upper limit, although it should be understood that by using solid acidic catalysts heated to temperatures greater than the boiling temperature, the ester cleavage can be conducted at these extreme conditions. In general, however, the preferred temperature range in which the process takes place at reasonable rates for the butyl beta-acetoxypropionate is that between about 230° to 260° C., at or about the boiling temperature of the ester.

While the cleavage is preferably carried out by heating only the esterified beta-acetoxypropionic acid with the acid catalyst, inert diluents may be employed. These diluents must necessarily be high boiling liquids with low vapor pressures at the cleavage temperature. Such compounds as high boiling hydrocarbons may be used for this purpose. The disadvantage of using such diluents is, of course, that small quantities of the diluents are removed from the reaction site with the cleavage products and must be subsequently separated therefrom.

As has been noted, the separation of the cleavage products from the reaction site and from each other is an important feature of the process of this invention. The products distilled from the heated-beta-acetoxypropionic acid ester-catalyst mixture must therefore be separated in order to prevent the transesterification described above. When these products are the acrylate ester and a water-soluble acid such as acetic acid, this separation can be readily accomplished, for example, by adding water to the distillate forming two liquid phases, an aqueous phase containing most of the acid with little or no ester and a separate ester phase which can then be separated by decantation or the like. When the acid split off is a water-insoluble acid it can be neutralized and the acrylate ester then separated. Still other separation methods can also be used.

After separation of the acrylate esters from the acid they can be purified in the usual way taking into account the fact that acrylate esters polymerize readily under the influence of heat, light and foreign substances which act as catalysts. For this reason care should be taken to keep the acrylate products thus recovered under conditions where they will not be subjected to polymerizing influences.

Preferred methods of carrying out the process of the present invention are illustrated in the following examples. It will be understood, however, that the examples are not given with the intent to limit unnecessarily the scope of the invention, and that numerous variations from the examples can be made without exceeding the scope of the invention as it is defined in the appended claims.

*Example 1*

The butyl ester of beta-acetoxypropionic acid was prepared by refluxing beta-acetoxypropionic acid in the presence of an excess of butyl alcohol, using benzene as a diluent, and 0.3%, based on the acid, of p-toluene sulfonic acid to render the reaction mixture acidic. After the calculated amount of water had been removed the ester was separated from the reaction mixture by distillation.

Under the noted conditions of dilution, the esterification of the acid took place with a minimum of ester cleavage. It should, however, be pointed out that the esterification should be conducted under these relatively mild reaction conditions, at the comparatively low boiling point of the benzene-butyl alcohol diluent. Under conditions of higher temperature, less dilution, and continuous removal of the cleavage products, the ester is, as will be seen, rapidly split to produce the acid and acrylate products. Upon analysis, the butyl beta-acetoxypropionate was found to have the following physical properties:

| | Theoretical | Found |
|---|---|---|
| B. P. | | 72° C. (1.0 mm.). |
| $n_D^{20}$ | | 1.4249. |
| C | 57.5 | 57.3. |
| H | 8.6 | 8.9. |
| Ester value, eq./100 g | 1.06 | 0.96. |

Samples of this ester were repeatedly distilled at atmospheric pressure without detectable degradation or cleavage taking place.

A 0.27 mole sample of the butyl beta-acetoxypropionate was mixed with 0.2% by weight of p-toluene sulfonic acid in a Claisen flask fitted with a phase-separating head. The head temperature was maintained at 110°–130° C. while the acid-ester reaction mixture was heated to 244° C. The vapors coming from the reaction mixture were separated in the head, with the condensed fraction being collected as it came down. The fraction so collected was washed twice with water, dried and filtered, then redistilled. In this way a 0.16 mole sample of butyl acrylate was recovered.

When heated with a small amount of acetyl peroxide catalyst, the butyl acrylate prepared in this manner polymerized to a clear water-white resin.

Example 2

A sample of the butyl beta-acetoxypropionate whose preparation was described in the previous example was mixed with 5% by weight of a solid calcined silica-alumina cracking catalyst, sold by American Cyanamid Company as MSA-2. The ester and solid catalyst were heated in a flask fitted with a phase separating head, as in the previous example, and a sample of butyl acrylate was recovered and purified by washing and distillation.

When heated with acetyl peroxide catalyst, the butyl acrylate polymerized to a water-white transparent resin.

Example 3

Allyl beta-acetoxypropionate was prepared by refluxing beta-acetoxypropionic acid with an excess of allyl alcohol, in benzene and in the presence of about 0.35% by weight of p-toluenesulfonic acid. The ester was separated from the reaction mixture by distillation and analyzed.

|  | Theoretical | Found |
| --- | --- | --- |
| Boiling point |  | 52° C. (0.2 mm.). |
| $n_D^{20}$ |  | 1.4382. |
| C | 55.8 | 55.7. |
| H | 7.1 | 7.2. |
| Ester value, eq./100 g | 1.16 | 0.94. |
| Bromine No., g./100 g | 93 | 101. |

Example 4

A sample of the allyl beta-acetoxypropionate was mixed with ½% by weight of commercial alkane sulfonic acid mixture of methane and ethane sulfonic acid in a distillation flask fitted, as in the previous examples, with a phase-separating head, and the cleavage of the ester conducted at atmospheric pressure.

A sample of allyl acrylate was recovered and redistilled to purify it. Upon heating with acetyl peroxide catalyst, the allyl acrylate polymerized to a hard clear water-white mass.

By reaction as in the preceding examples butyl acrylate is obtained from butyl beta-formoxypropionate, methyl methacrylate from methyl beta-propionoxyisobutyrate, ethyl crotonate from ethyl beta-acetoxy-beta-methyl propionate, and oleyl acrylate is obtained from oleyl beta-acetoxypropionate.

It will thus be seen that while the production of esters of unsubstituted acrylic acid has been emphasized in the foregoing because of the special advantages of the process of the invention in the production of these esters, the new method is also applicable to the production of esters of substituted acrylic acids, especially of alkyl substituted acrylic acids having one to two carbon atoms per alkyl group and not more than one alkyl group directly linked to an unsaturated carbon atom, and not more than two carbon atoms per alkyl group. The acrylic acid esters as referred to in the following claims will therefore be recognized as including the esters of substituted acrylic acids as well as of the unsubstituted acids.

I claim as my invention:

1. A process for the preparation of an acrylic acid ester, which comprises cleaving an ester of a beta-acyloxypropionic acid and an aliphatic alcohol having at least three carbon atoms, the acyl radical of which is that of a saturated fatty acid containing no more than eight carbon atoms in the liquid phase and, in the presence of a non-volatile strong acid selected from the group consisting of arylsulfonic acids and solid acidic alumina-silica cracking catalysts while separating the resulting acid and the acrylate ester from the reaction mixture substantially as fast as they are formed.

2. A process for the preparation of an acrylic acid ester, which comprises cleaving an ester of beta-acetoxypropionic acid in the liquid phase and in the presence of a non-volatile strong acid selected from the group consisting of arylsulfonic acids and solid acidic silica-alumina cracking catalysts, while separating the resulting acetic acid and the acrylate ester from the reaction mixture substantially as fast as they are formed.

3. A process for the preparation of an acrylic acid ester, which comprises cleaving an ester of beta-acetoxypropionic acid, the ester being that of an aliphatic alcohol having at least three carbon atoms in the liquid phase and, to a temperature in excess of 100° C., in the presence of a non-volatile strong acid selected from the group consisting of arylsulfonic acids and solid acidic silica-alumina cracking catalysts, while separating the resulting acetic acid and the acrylate ester from the reaction mixture substantially as fast as they are formed.

4. The process of claim 3, wherein the ester of beta-acetoxypropionic acid is butyl beta-acetoxypropionate.

5. The process of claim 3, wherein the ester of beta-acetoxypropionic acid is allyl beta-acetoxypropionate.

6. The process of claim 3, wherein the acid is para-toluene sulfonic acid.

7. The process of claim 3, wherein the acid is a solid alumina-silica cracking catalyst having an acidic surface.

References Cited in the file of this patent
UNITED STATES PATENTS

| 2,183,357 | Ritchie et al. | Dec. 12, 1939 |
| 2,457,225 | Gresham | Dec. 28, 1948 |
| 2,464,768 | Redmon et al. | Mar. 15, 1949 |

OTHER REFERENCES

Fisher et al.: Ind. and Eng. Chem., vol. 36, No. 3, March 1944, pages 229 to 234, 260–486.